W. MARKY, DEC'D.
C. MARKY, ADMINISTRATOR.
BRAKE MECHANISM FOR RAILWAY CARS.
APPLICATION FILED JUNE 3, 1915.
1,284,205.
Patented Nov. 5, 1918.
2 SHEETS—SHEET 1.
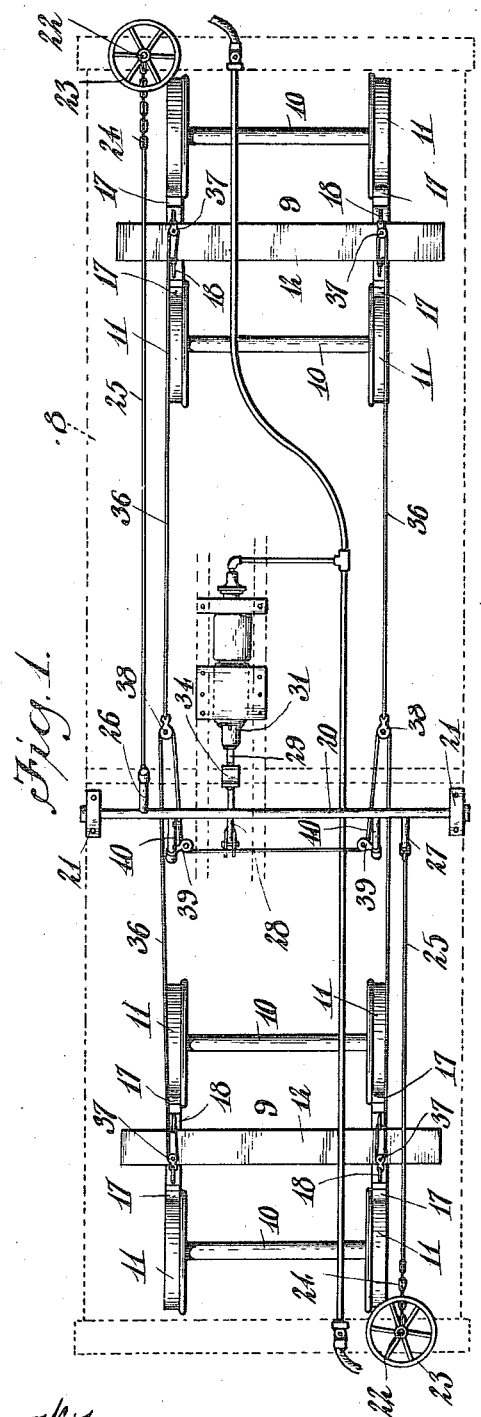
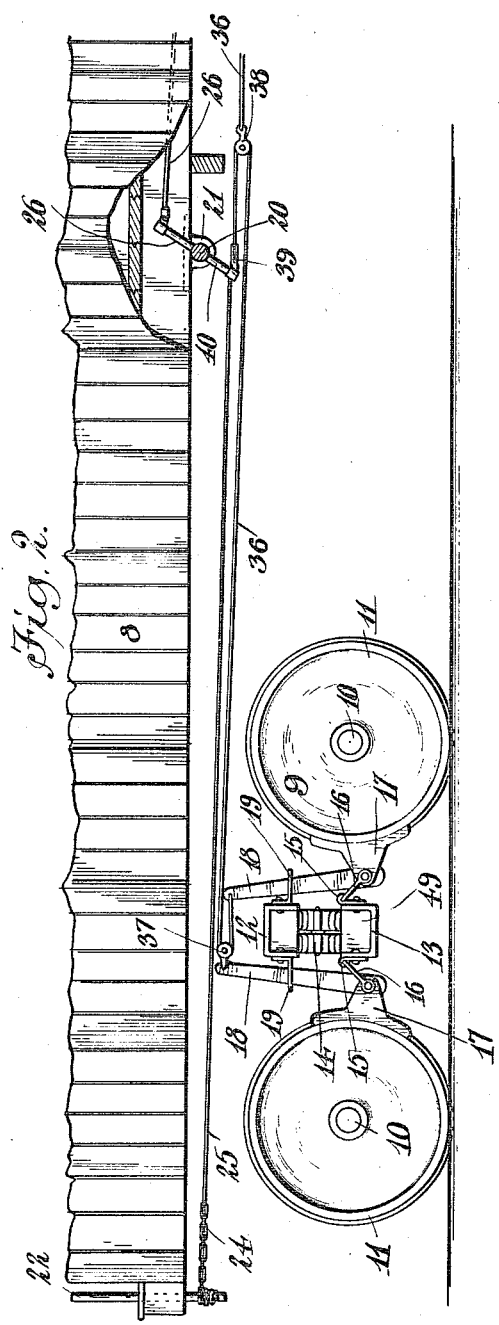
William Marky, Inventor.
Witness
Jacob Oberst, Jr.,
Attorney.

W. MARKY, DEC'D.
C. MARKY, ADMINISTRATOR.
BRAKE MECHANISM FOR RAILWAY CARS.
APPLICATION FILED JUNE 3, 1915.
1,284,205.
Patented Nov. 5, 1918.
2 SHEETS—SHEET 2.
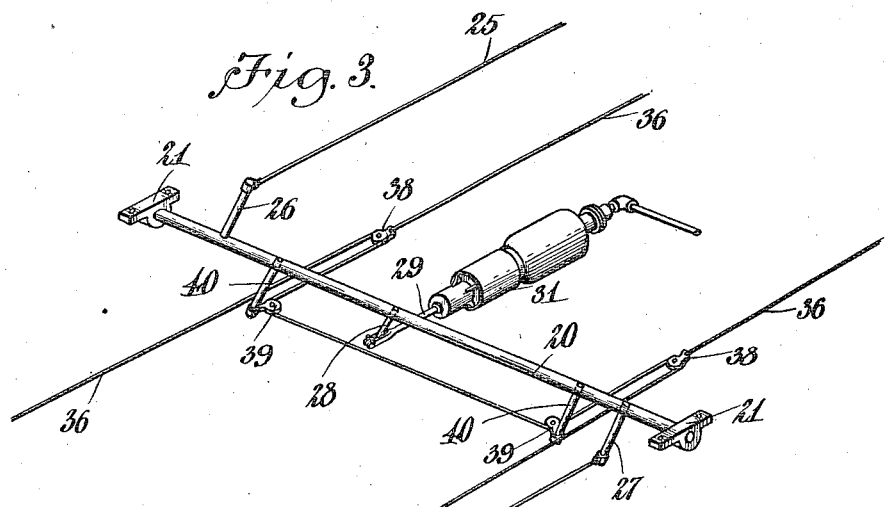
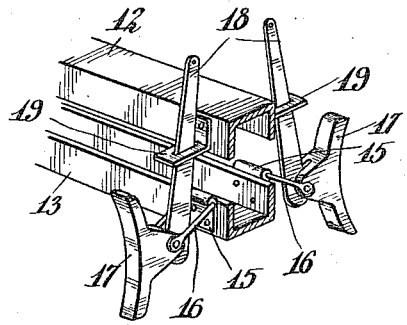
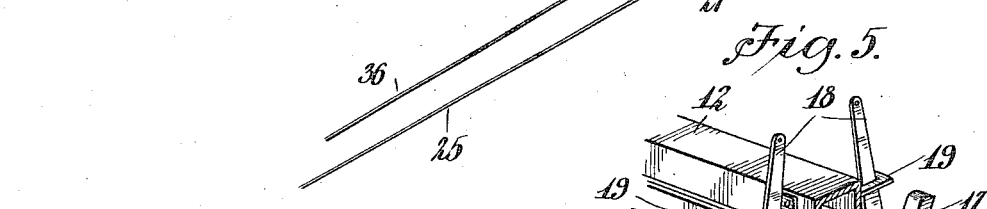
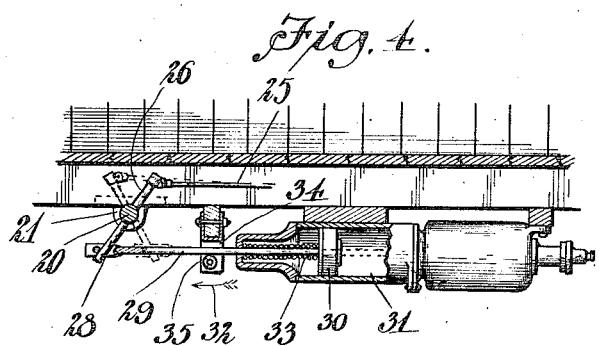
Witness:
Jacob Oberst, Jr.
William Marky, Inventor.
By Emil Neubach
Attorney.

UNITED STATES PATENT OFFICE.

WILLIAM MARKY, OF BUFFALO, NEW YORK; CHARLES MARKY ADMINISTRATOR OF SAID WILLIAM MARKY, DECEASED.

BRAKE MECHANISM FOR RAILWAY-CARS.

1,284,205.  Specification of Letters Patent.  Patented Nov. 5, 1918.

Application filed June 3, 1915. Serial No. 31,900.

*To all whom it may concern:*

Be it known that I, WILLIAM MARKY, a citizen of the United States, residing at Buffalo, in the county of Erie and State of New York, have invented certain new and useful Improvements in Brake Mechanism for Railway-Cars, of which the following is a specification.

My invention relates to brake mechanism for railway cars.

The primary object of my invention is to so construct the brake mechanism that the car trucks are free to swing without in any manner affecting the action of the brake shoes against the car wheels.

Another object is to provide independently acting brake shoes for the several wheels so that the combined brake-shoe pressure on all the wheels at one side of the car will be equal to the combined brake-shoe pressure on all the wheels at the other side of the car regardless of any twisting or unequal straining of parts; and in so supporting the brake shoes that they will at all times be retained in proper position relative to the treads of the car wheels, whether the car is traveling in a straight line or around curves.

The invention also has for its object the provision of a compensating connection between the several brake mediums so that the combined pressure exerted by the shoes against the treads of the wheels at one side of the car will at all times be equal to the combined pressure against the wheels at the other side of the car.

In ordinary brake systems in which brake shoes are attached to brake beams extending crosswise of the car, the chain or rod connections, as the case may be, between the brake beams and the cylinder actuating or hand actuating mechanism are invariably strained unequally, and this is particularly true when rounding curves, at which time the shoes which are at one side of the car are caused to ride onto the flanges of the wheels while the shoes at the other side leave the treads of the wheels or only partly bear against the same.

By dispensing with the usual brake beams connecting two brake shoes arranged at opposite sides of the car I am enabled to obviate all tendency of the brake shoes moving laterally, which is another highly desirable feature of my invention.

With the above and other objects in view, the invention consists in providing brake mechanism with independently acting brake shoes for the several wheels.

It also consists in the provision of compensating connection between the several brake devices so that the combined pressure exerted by the shoes against the wheels at one side of the car will at all times be equal to the combined pressure against the wheels at the other side of the car.

It further consists in the novel features of construction and in the arrangement and combination of parts to be hereinafter described and particularly pointed out in the subjoined claims.

In the drawings,—

Figure 1 is a plan view of the trucks of a car equipped with my improved brake mechanism, the body of the car being shown in dotted lines.

Fig. 2 is a side elevation of a portion of the car showing the brake mechanism at one end thereof and the connection of the same with the central actuator.

Fig. 3 is a perspective view of the parts of the brake mechanism located at the center of the car.

Fig. 4 is a longitudinal section through a portion of the car showing the connection of the central actuator with the air-controlled portion of the brake mechanism.

Fig. 5 is a perspective view of a pair of brake shoes and the parts supporting the same; also the brake levers immediately connected to said shoes.

Fig. 6 is a section showing a modified form of brake shoe bearing against the tread of a wheel and showing the support for the shoe and the lever immediately actuating the same.

Fig. 7 is a perspective view of the brake shoe in modified form and its supporting parts.

Referring now to the drawings in detail, similar numerals of reference refer to similar parts in the several figures.

The reference numeral 8 designates the car body supported upon the usual trucks 9 at opposite ends of the car. In the particular form of car shown, each truck has two car wheel axles 10, on each of which a pair of car wheels 11 is mounted. These axles are journaled in suitable boxes (not shown) which form part of the truck, it being believed that it is necessary to disclose only so much of the truck as is intimately connected with the brake mechanism, and to this end I have shown each truck provided with a bolster 12, the usual spring plank member 13 beneath the bolster, and the springs 14 between the two which yield in proportion to the weight carried by the car, as is common in car construction. These springs may be of any well known type and be secured in any practicable manner. In order to travel over curved portions of a track the trucks are of course pivotally secured to the body of the car by means of the usual king bolt, and the bolster is provided with the usual truck center plate with which coöperates the body center plate and through both of which and the bolster the king bolt is passed. However, as there are many forms of trucks now in use, any arrangement permitting the trucks to swivel or turn to conform to the curvature of the track may be used in connection with my invention.

At each end of the spring plank member 13 of each truck and at opposite sides thereof I provide brackets or carriers 15, to which are pivotally secured supporting links 16 having brake shoes 17 pivotally attached thereto, said shoes being adapted to be moved toward and from the treads of the car wheels by means of the brake levers 18 which are also pivotally secured at or near their lower ends to said brake shoes, preferably by means of the same pivots which fasten the brake shoes to the supporting links.

In the form of truck shown, there are two brake shoes between the two wheels at each side of the truck, and it may be said that the brake shoes are thus paired, also the supporting links and brake levers associated therewith. The brake levers extend upwardly from their pivotal points of connection to the brake shoes and pass loosely through slotted brackets 19 fastened to opposite sides of the bolster 12. In the drawings I have shown four pairs of brake shoes, each pair being capable of action independently of the other, and the brake levers of these brake shoes are actuated by means of a central actuator in the form of a rock shaft 20 and intermediaries to be presently described.

The rock shaft 20 is positioned between the two trucks of the car and arranged transversely, it being suitably journaled in bearings 21 fastened to the car body in any practicable manner. At each end of the car is a vertically-disposed brake shaft 22 having secured to its upper end a hand wheel 23, and to the lower end of each of said shafts a brake-shaft chain 24 is secured, these chains being directed inwardly toward the center of the car and having their inner ends connected to brake-shaft connecting rods 25, the inner extremities of said rods being attached to arms 26, 27, respectively, extending from the rock shaft 20; said arms being oppositely directed so that the rock shaft may be actuated independently by the brake shafts at either end of the car. Said rock shaft has also an arm 28 extending therefrom which has pivotal connection with the piston rod 29 extending from an air-controlled piston 30 within a cylinder 31.

As the air-brake system forms no part of my invention, I will state that my invention may be used in conjunction with any air-brake system, it being simply necessary to connect the rock shaft 20 with said system in the manner that said shaft is caused to rock when controlling the brakes by means of the system. In this particular instance, when the piston 30 is moved outwardly or in the direction of the arrow 32 in Fig. 4, the rock shaft is caused to rotate in exactly the same manner as when actuated by either of the brake shafts 22 at opposite ends of the car, the piston being returned or moved inwardly within the cylinder by means of a spring 33 or otherwise, after being relieved of pressure. The piston rod 29 may be guided in a bracket 34, and in the particular construction shown, a roller 35 is rotatably mounted in the bracket in contact with which said rod travels.

The intermediaries between the rock shaft 20 and the several pairs of brake levers 18 include compensating mechanism so that the rocking movement of the shaft 20 is imparted to the various brake-levers in such manner that the combined brake-shoe pressure at one side of the car equals the combined brake-shoe pressure at the other side thereof regardless of whether the car is traveling in a straight line or over a curved portion of the track. These intermediaries and compensating mechanism may comprise cables, chains, or rods or a combination of such elements, as may be found desirable.

In the particular construction disclosed I have secured to one of each pair of brake levers 18 one end of a cable or chain 36, or other flexible element and passed the same around a roller or sheave 37 secured to the other brake lever of the pair. From these rollers or sheaves the cables or chains are directed inwardly toward the rock shaft 20, those extending inwardly from the brake levers at one end of the car having rollers or sheaves 38 secured to their inner ends, while the cables or chains from the levers at the opposite end of the car pass around said last-mentioned rollers or sheaves and are returned to pass around rollers or sheaves 39 secured to arms 40 extending from the rock shaft 20. From the rollers or sheaves 39 on said arms, the last-mentioned cables or chains are brought together and connected in any suitable manner; or if desired, a single cable or chain may be passed around the rollers or sheaves 39, 38, and 37, with their ends secured to one of each pair of brake levers at the last-mentioned end of the car. In this manner the cables or chains extending inwardly from opposite trucks are connected together in the arrangement described.

The operation of the device is as follows,—

Upon rotating either of the brake shafts 22, the central actuator or shaft 20 is caused to rotate. This causes the arms 40 of said rock shaft to swing to the left in Fig. 1 and the cables or chains leading to the various brake levers to be drawn upon, and as the brake levers are connected in pairs, those of each pair are moved toward each other, the levers being fulcrumed within the slotted brackets 19 so that their lower ends, which are pivotally attached to the brake shoes 17, are swung outwardly or away from each other, thus forcibly pressing said shoes against the treads of the wheels. By reason of the brake shoes being disconnected from each other they are maintained at all times in proper relation with respect to the treads of the wheels. When braking the car while the latter is rounding a curve, the trucks are swung at an angle to a line passing transversely through the car, which causes the wheels of the two trucks at one side of the car to be moved farther away from each other while those at the other side are moved closer to each other. This necessitates the lengthening of the cables or chains at one side of the car and the shortening of the same at the other side in order to prevent unequal pressure of the brake shoes against the wheels. This adjustment is effected automatically by reason of the chains or cables at one end of the car moving over the rollers or sheaves 38, 39, so that the cables or chains may be said to be self adjusting. Therefore, when applying the brake mechanism, there is no tendency of any of the shoes crowding laterally so as to ride over the flanges of the wheels or partly off the treads thereof. The same action takes place when braking the car by means of the air system, as will be clear from the drawings.

By reason of the brake levers 18 passing through the slots of the brackets 19, in which they are fulcrumed, the bolster 12 may lower or rise independent of said levers, thus bringing the fulcrum points of the levers, closer to or farther from the brake shoes, in exact accordance with the weight within the car. In this manner the braking power is increased or diminished according to the weight carried by the car and the momentum of the car after the brake shoes are first brought into contact with the wheels. This is a decided advantage in trains composed of empty and heavily laden cars or cars that carry loads of marked difference in weight, since the brake shoes are applied with pressure in exact proportion to the momenta of the cars.

In the modification shown in Figs. 6 and 7 the brake levers 18 are pivotally attached to the brake shoes 17, but instead of securing slotted brackets 19 to the bolster, slotted brackets 41 are secured to the spring plank member; but in this instance such brackets serve merely as guides, since the brake levers 18 are pivotally attached to the bolster, as at 42. The brake shoe is formed in two parts 43, 44, the shoes proper or brake member having an outstanding lug 45 which fits into a depression 46 formed in the head or holder 47, said head or holder being bifurcated to receive the lower end of the brake lever which is pivotally attached thereto. The head and shoe proper are secured together by means of a bolt 48, as best shown in Fig. 6.

The bolsters and spring plank members are shown as constructed of beams of channel formation in cross section with a filling of wood, as shown at 49, in Fig. 2.

Having thus described my invention, what I claim is:—

1. In a brake mechanism for cars, the combination with a truck having a bolster and a spring plank member beneath said bolster, hangers secured to said spring plank member, supporting links pivotally secured to said hangers, brake shoes pivotally secured to said supporting links and adapted to act against the wheels of the truck, and vertically-disposed brake levers fulcrumed between their ends and having their lower ends connected to said brake shoes and their upper ends extending to a plane above said bolster.

2. In a brake mechanism for cars, the combination with a truck having two axles and wheels at opposite ends of the axles, of transversely-disposed members interposed between said axles, vertically-disposed brake levers fulcrumed to one of said transversely disposed members and arranged in pairs at each end of the latter, one of each pair being at each side of said member, brake shoes pivotally connected to the lower end of said brake levers, and flexible means connecting said brake levers for actuating the same, said flexible means being arranged to cause the combined brake-shoe pressure at one side of the car to equal the combined brake-shoe pressure at the other side thereof.

3. In a brake mechanism for cars, the combination of a pair of swiveled trucks at opposite ends of the car, each having a pair of axles and wheels at opposite ends of said axles, brake shoes acting against said wheels in pairs, brake levers to which said brake shoes are secured, a rock shaft arranged transversely underneath the body of the car, and means of connection between said rock shaft and said brake levers including compensating mechanism acting under all conditions to cause the combined brake shoe pressures at one side of the car to equal the combined brake shoe pressures at the other side thereof.

4. In a brake mechanism for cars, the combination with a pair of swiveled trucks at opposite ends of the car, brake shoes arranged in pairs at each end of each truck, brake-levers to which said brake shoes are secured, a rock shaft arranged transversely in a plane between said trucks, a flexible connection between said rock shaft and the brake shoe of one truck shaft, and a flexible connection between the first-mentioned flexible connection and each pair of brake shoes of the other truck.

5. In a brake mechanism for cars, the combination with a pair of trucks swiveled at opposite ends of the car, an independently supported brake shoe for each wheel of the car, an actuator member, manually-controlled and power-controlled mechanism connected to said actuator member and operable independently, and flexible connections between said actuator member and the various brake shoes including compensating mechanism to shorten said connections at one side of the car and lengthen the same at the other when the car is traveling over a curved portion of the track and whereby under all running conditions of the car the combined brake-shoe pressure at one side thereof equals the combined brake-shoe pressure at the other side thereof.

6. In a brake mechanism for cars, the combination of a pair of trucks swiveled at opposite ends of the car, a rock shaft arranged transversely in a plane between said trucks and having a pair of arms extending therefrom, independently supported brake shoes, actuating mechanism extending inwardly from the brake shoes at each end of the car and connected together to permit one to adjust itself relatively to the other, said actuating mechanism having connection with said rock shaft.

7. In a brake mechanism for cars, the combination with a pair of trucks swiveled to opposite ends of the car, a brake shoe for each wheel of the car, independently supported brake levers fulcrumed to the truck and adapted to actuate said brake shoes, a rock shaft arranged transversely in a plane between said trucks and having a pair of arms, actuating members extending inwardly from the brake levers at one end of the car, and flexible connection between the brake levers at the other end of the car and the arms of said rock shaft, said flexible connection being connected to the first-mentioned actuating mechanism and free to adjust itself thereon and on the arms of said rock shaft.

8. In a brake mechanism for cars, the combination with a pair of trucks swiveled at opposite ends of the car, brake shoes acting against the wheels of each truck, brake levers fulcrumed to each truck and pivotally connected to said brake shoes, said levers being arranged in pairs and one of each pair having a sheave, a rocking actuator member having arms extending therefrom, sheaves on said arms, flexible actuating devices connected to the brake levers of one truck and extending inwardly therefrom, said actuating devices having sheaves at their inner ends, and a flexible connection passing through the sheaves of the arms on said rocking actuator member, through the sheaves of said flexible actuating devices and through the sheaves on the brake levers at the opposite end of the car and having its ends secured to the brake levers co-acting with said last-mentioned brake levers.

In testimony whereof I affix my signature.

WILLIAM MARKY.